(No Model.)
E. P. CURTIS.
CUTTING APPARATUS FOR HARVESTERS.
No. 252,575. Patented Jan. 17, 1882.
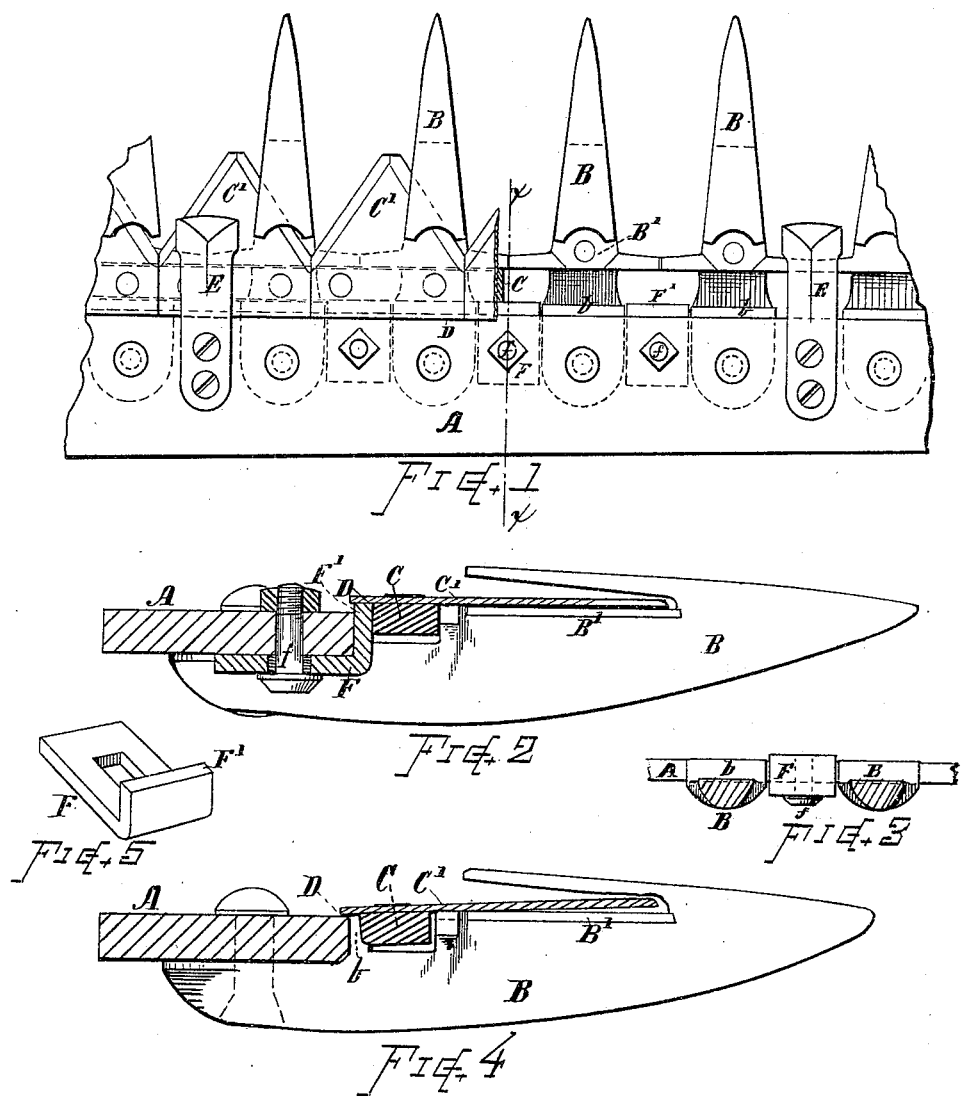
Witnesses.
Geo. M. Nice 2d
Geo. M. Reed
Inventor
Edwin P. Curtis
By Chas. H. Burleigh
Atty

UNITED STATES PATENT OFFICE.

EDWIN P. CURTIS, OF WORCESTER, MASSACHUSETTS, ASSIGNOR TO THE RICHARDSON MANUFACTURING COMPANY, OF SAME PLACE.

CUTTING APPARATUS FOR HARVESTERS.

SPECIFICATION forming part of Letters Patent No. 252,575, dated January 17, 1882.

Application filed August 29, 1881. (No model.)

*To all whom it may concern:*

Be it known that I, EDWIN P. CURTIS, of Worcester, in the county of Worcester and State of Massachusetts, have invented certain new and useful Improvements in Harvesters; and I declare the following to be a description of my said invention sufficiently full, clear, and exact to enable others skilled in the art to which it appertains to make and use the same, reference being had to the accompanying drawings, which form a part of this specification.

In ordinary practice the fingers of mowing and reaping machines are commonly made from soft malleable iron, and are fixed to a finger-bar of wrought-iron. Said fingers are re-enforced or faced with a steel ledger-plate or shearing-blade, upon and across which the scythe-sections operate for shearing off the stalks of grass or grain, the reciprocating rod to which the cutting-sections are fastened being arranged to play back and forth in a recess or groove formed across the finger near its junction with the finger-bar. The action and strain on the scythe, when the machine is in use, cause a backward and downward wear at the rear part of the scythe, since the soft iron at the rear side of the scythe-rod can wear away much faster the ledger-plates under the sections just in front of said rod. As a consequence the rod and sections by wear tend to assume an inclined position, throwing the points of the sections up from the cutting-plates of the fingers, so as to destroy their shearing contact, and allowing them to wear into the upper guard of the fingers, thereby greatly detracting from the efficiency of the mechanism, as well as subjecting the devices to unnecessary strain and destructive action.

The object of my present invention is to obviate this defect and provide an efficient means for sustaining the scythe in proper relation to the bar and fingers, and to prevent the injurious wear of the mechanism. This object I attain by combining with the finger-bar and scythe a peculiarly-constructed chafing-piece, as herein shown and described.

In the drawings, Figure 1 shows a plan view of such portions of a harvesting-machine as are necessary to illustrate the nature of my invention. Fig. 2 is a transverse section of the finger-bar at line *x x*, larger scale. Fig. 3 is a front view of a portion of the bar. Fig. 4 is a transverse section similar to Fig. 2, showing the effects of wear in the ordinary construction. Fig. 5 is a perspective view of the chafing-piece.

In reference to the drawings, A denotes the finger-bar; B, the fingers, secured thereto in the usual manner; B', the ledger-blades or shear-plates, fixed on the fingers; *b*, the bearing-lip of the finger against the front of the bar; C, the scythe-rod; C', the cutting-sections, fixed to said rod with overhanging rear edges at D; and E the top buttons for holding down the scythe, all of which parts may be of substantially ordinary construction.

F indicates the chafing-piece, formed of hardened steel, which I arrange on the front of the bar A, between the fingers B, in such a manner that its end or lip F' shall support the scythe rod and sections against rearward and downward strains or pressure. The lip F' is slightly larger than the lip *b* of the fingers, and its upper angle fits into the angle D, formed by the overhanging of the sections C' beyond the rod C, so that the rear of the scythe is supported by said chafing-pieces, which take the strain and wear of the mechanism, and hold the cutters to their work by keeping the rear ends in their proper relation, so that the points of the sections will hug close down to the plates B'. These pieces F may be arranged between each pair of fingers, or may be disposed at such intervals as may be necessary or desired to meet the requirements of the case. Said pieces F are secured to the front edge of the bar from beneath by the bolts *f* or otherwise, if desired, and may be made adjustable to take up wear, or fixed solidly in position. They can readily and cheaply be replaced when worn out.

The chafing-pieces, arranged in the manner shown and described, serve to protect the finger-bar, to save the scythes and fingers, to insure better cutting action, and to improve the running effectiveness of the cutting mechanism, and, being small independent parts, are comparatively inexpensive, so that the cost of detachment and renewal is as nothing compared with the expense of other portions, renewal of which is required if the chafing-pieces are not used.

What I claim as of my invention, and desire to secure by Letters Patent, is—

1. A chafe-piece for harvester-cutters, consisting of a perforated or slotted plate having an upward-turned lip, flange, or wearing end, said piece being fitted or attached to the forward part of the finger-bar between adjacent fingers, substantially as shown, and for the purpose set forth.

2. The combination of independently detachable chafe-pieces F, provided each with a bearing end or lip, F', formed of hardened steel, with the finger-bar A, the fingers B, and the scythe C in a harvesting-machine, said chafe-pieces being arranged on the finger-bar between fingers with their ends F' in position to form bearings for the scythe in rear of the rod and beneath the overhanging cutter-sections, substantially as herein shown and described.

Witness my hand this 25th day of August, A. D. 1881.

EDWIN P. CURTIS.

Witnesses:
CHAS. H. BURLEIGH,
GARDNER R. PARKER.